(12) United States Patent
Luis y Prado

(10) Patent No.: US 11,394,342 B2
(45) Date of Patent: Jul. 19, 2022

(54) MODULAR SOLAR PANEL ASSEMBLY

(71) Applicant: Workshops for Warriors, San Diego, CA (US)

(72) Inventor: Hernán Luis y Prado, San Diego, CA (US)

(73) Assignee: Workshops for Warriors, San Diego, CA (US)

( * ) Notice: Subject to any disclaimer, the term of this patent is extended or adjusted under 35 U.S.C. 154(b) by 103 days.

(21) Appl. No.: 16/550,130

(22) Filed: Aug. 23, 2019

(65) Prior Publication Data
US 2021/0058024 A1 Feb. 25, 2021

(51) Int. Cl.
*H02S 20/30* (2014.01)
*H02S 40/10* (2014.01)
*H02S 30/10* (2014.01)
*H02S 30/20* (2014.01)
*H02S 40/42* (2014.01)

(52) U.S. Cl.
CPC .............. *H02S 20/30* (2014.12); *H02S 40/10* (2014.12); *H02S 30/10* (2014.12); *H02S 30/20* (2014.12); *H02S 40/425* (2014.12)

(58) Field of Classification Search
CPC .......... H02S 20/23; H02S 20/24; H02S 20/30; H02S 40/10; H02S 30/10; H02S 30/20; H02S 20/00–32; H02S 40/34; F24S 25/33; F24S 25/35; F24S 25/37; F24S 2025/80; F24S 2025/801; F24S 2025/802
USPC .................................. 136/244–251
See application file for complete search history.

(56) References Cited

U.S. PATENT DOCUMENTS

| | | | | |
|---|---|---|---|---|
| 5,125,608 A | * | 6/1992 | McMaster | H02S 20/10 248/163.1 |
| 5,180,442 A | | 1/1993 | Elias | |
| 6,065,255 A | * | 5/2000 | Stern | H02S 20/23 52/173.3 |
| 7,230,819 B2 | | 6/2007 | Muchow et al. | |
| 2004/0011354 A1 | | 1/2004 | Erling | |
| 2008/0169018 A1 | | 7/2008 | Miyamoto et al. | |
| 2009/0007901 A1 | * | 1/2009 | Luconi | F24S 25/61 126/627 |

(Continued)

FOREIGN PATENT DOCUMENTS

| | | | |
|---|---|---|---|
| CN | 203260597 U | * | 10/2013 |
| CN | 108435654 A | * | 8/2018 |
| WO | WO2018109524 A1 | | 6/2018 |

OTHER PUBLICATIONS

CN203260597U English machine translation (Year: 2013).*
CN108435654A English machine translation (Year: 2018).*

*Primary Examiner* — Andrew J Golden
(74) *Attorney, Agent, or Firm* — Fish & Richardson P.C.

(57) ABSTRACT

A modular solar panel assembly includes a pair of mounting rails that extend parallel to each other along a longitudinal direction. First and second handle members extending laterally between the mounting rails are provided at longitudinal end portions of the mounting rails. One or more cross members that extend laterally between the mounting rails are also provided. A plurality of solar panels are attached to the pair of mounting rails. A gap is defined between each of the handle member and the closest corresponding edge of the plurality of solar panels. A vertical thickness of the first and second handle members is less than a vertical thickness of the pair of mounting rails.

20 Claims, 10 Drawing Sheets

(56) References Cited

U.S. PATENT DOCUMENTS

| | | | | |
|---|---|---|---|---|
| 2010/0236183 A1* | 9/2010 | Cusson | H02S 20/30 | 52/645 |
| 2010/0269446 A1* | 10/2010 | Merrifield | E04C 3/005 | 52/646 |
| 2011/0094569 A1* | 4/2011 | Hartley | H02S 20/22 | 136/251 |
| 2011/0138711 A1* | 6/2011 | Seng | F24S 25/37 | 52/173.3 |
| 2011/0248137 A1* | 10/2011 | Barba | F24S 25/37 | 248/309.1 |
| 2013/0092215 A1* | 4/2013 | Schroeder | H02S 20/10 | 136/251 |
| 2013/0175231 A1* | 7/2013 | Klinga | H02S 30/10 | 211/41.1 |
| 2014/0014165 A1* | 1/2014 | Echizenya | H02S 30/10 | 136/251 |
| 2015/0059381 A1* | 3/2015 | Hoffmann | H02S 20/30 | 62/235.1 |
| 2016/0254774 A1* | 9/2016 | Brady | H02S 20/30 | 136/251 |
| 2016/0352285 A1* | 12/2016 | Seery | H02S 10/40 | |
| 2019/0259892 A1* | 8/2019 | Moslehl | H02S 40/30 | |

* cited by examiner

MODULAR SOLAR PANEL ASSEMBLY

TECHNICAL FIELD

The present disclosure relates to a solar panel assembly and, in particular, to a modular system for assembling and interconnecting solar panels.

BACKGROUND

Solar panels, which are made up one or more solar cells (also called photovoltaic cells), are widely used as a renewable sources of energy for commercial as well as residential applications. Solar panels can be particularly useful for field-deployable applications where electricity may not otherwise be available. A simplified approach to transporting, assembling, and/or installing solar panels will be especially useful for such applications.

SUMMARY

According to one aspect of the subject matter described in this application, a modular solar panel assembly includes a pair of mounting rails that extend parallel to each other along a longitudinal direction of the solar panel assembly, a first handle member extending laterally between the pair of mounting rails at a first longitudinal end portion of the mounting rails, a second handle member extending laterally between the pair of mounting rails at a second longitudinal end portion of the mounting rails opposite the first longitudinal end portion, one or more cross members that extend laterally between the pair of mounting rails, the one or more cross members being positioned between the first and second handle members in the longitudinal direction, and a plurality of solar panels that are attached to the pair of mounting rails, the plurality of solar panels being arranged adjacent to each other along the longitudinal direction. A first gap is defined between the first handle member and a first longitudinal edge of the plurality of solar panels that is closest to the first handle member, and a second gap is defined between the second handle member and a second longitudinal edge of the plurality of solar panels that is closest to the second handle member. A vertical thickness of the first and second handle members along a vertical direction that is orthogonal to the longitudinal and lateral directions is less than a vertical thickness of the pair of mounting rails.

Implementations according to this aspect may include one or more of the following features. For example, a cross-sectional area of the one or more cross members may be greater than a cross-sectional area of the first and second handle members. The first and second handle members may have a circular cross-section. The first and second handle members may include a textured or rubberized outer surface. Also, the pair of mounting rails and the one or more cross members may have a rectangular cross-section. The plurality of solar panels may be attached to an upper surface of the pair of mounting rails.

In some implementations, an airflow passage may be defined between a lower surface of the plurality of solar panels and an upper surface of the one or more cross members and the first and second handle members. The airflow passage may extend continuously from the first longitudinal end portion to the second longitudinal end portion. In some cases, the first and second members and the pair of mounting rails may define open faces at respective longitudinal end surfaces of the solar panel assembly. Here, the upper surface of the one or more cross members may be positioned vertically lower than the upper surface of the pair of mounting rails. The pair of mounting rails and the one or more cross members may define interior conduits.

In some implementations, the modular solar panel assembly according to this aspect may further include a plurality of support legs that extend vertically downward from the first and second longitudinal end portions of the mounting rails to elevate the plurality of solar panels from a ground surface. Accordingly, the modular solar panel assembly may be configured to be free standing on the ground surface via the plurality of support legs. In some cases, the modular solar panel assembly may further include a gutter structure that is accommodated in one or both of the first and second gaps. Here, the gutter structure may be configured to receive water flowing from upper surfaces of the plurality of solar panels. The gutter structure may include one or more side spouts that extend laterally beyond the lateral outer surfaces of the mounting rails to discharge the received water.

In some implementations, a metal frame may surround a periphery of each of the plurality of solar panels, the metal frame defining a space underneath the solar panel. One or more of the one or more cross members may be provided at positions that correspond to gaps defined between adjacent ones of the plurality of solar panels. Alternatively, one or more of the one or more cross members may be provided at positions that do not overlap with gaps defined between adjacent ones of the plurality of solar panels. In some cases, a pressure washing system may be provided at one longitudinal end of the solar panel assembly. The pressure washing system may be configured to spray water onto a surface of the solar panel. Water supply pipes may be disposed inside the mounting rails. The water supply pipes may be configured to supply pressurized water to the pressure washing system.

In some implementations, a solar panel system may include a plurality of the modular solar panel assemblies according to this aspect. Here, the plurality of modular solar panel assemblies may be arranged adjacent to each other along the lateral direction and coupled to each other via coupling holes defined at lateral outer surfaces of the mounting rails. In some cases, the solar panel system may further include a plurality of support legs that extend vertically downward from four corner regions of the solar panel system to elevate the plurality of the modular solar panel assemblies from a ground surface. Accordingly, the solar panel system may be configured to be free standing on the ground surface via the plurality of support legs.

These and other aspects, features, and implementations will become apparent from the following descriptions, including the claims.

DETAILED DESCRIPTION

Hereinafter, one or more example implementations will be described in detail with reference to the accompanying drawings.

Figure 1:
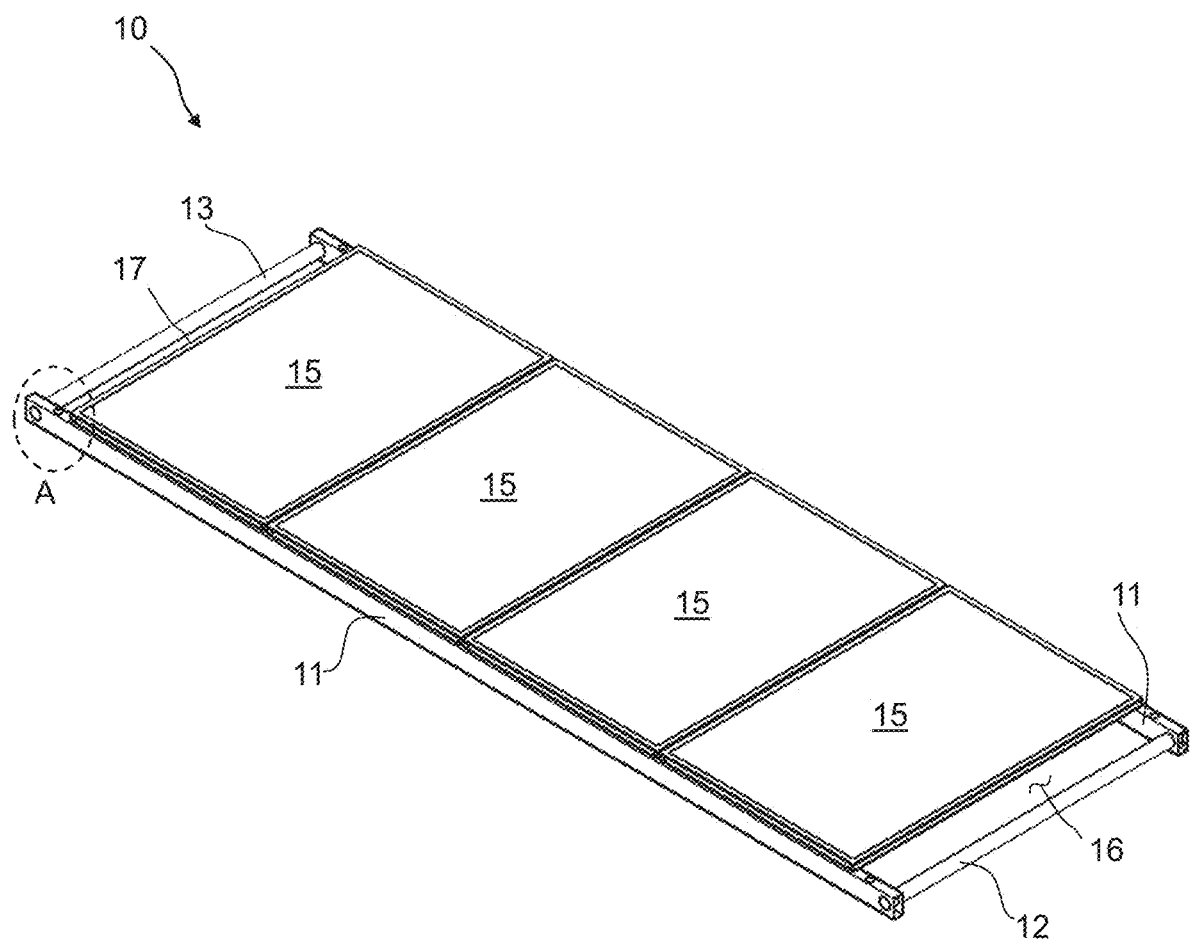
FIG. 1 shows a perspective view of an example modular solar panel assembly.
Figure 2:
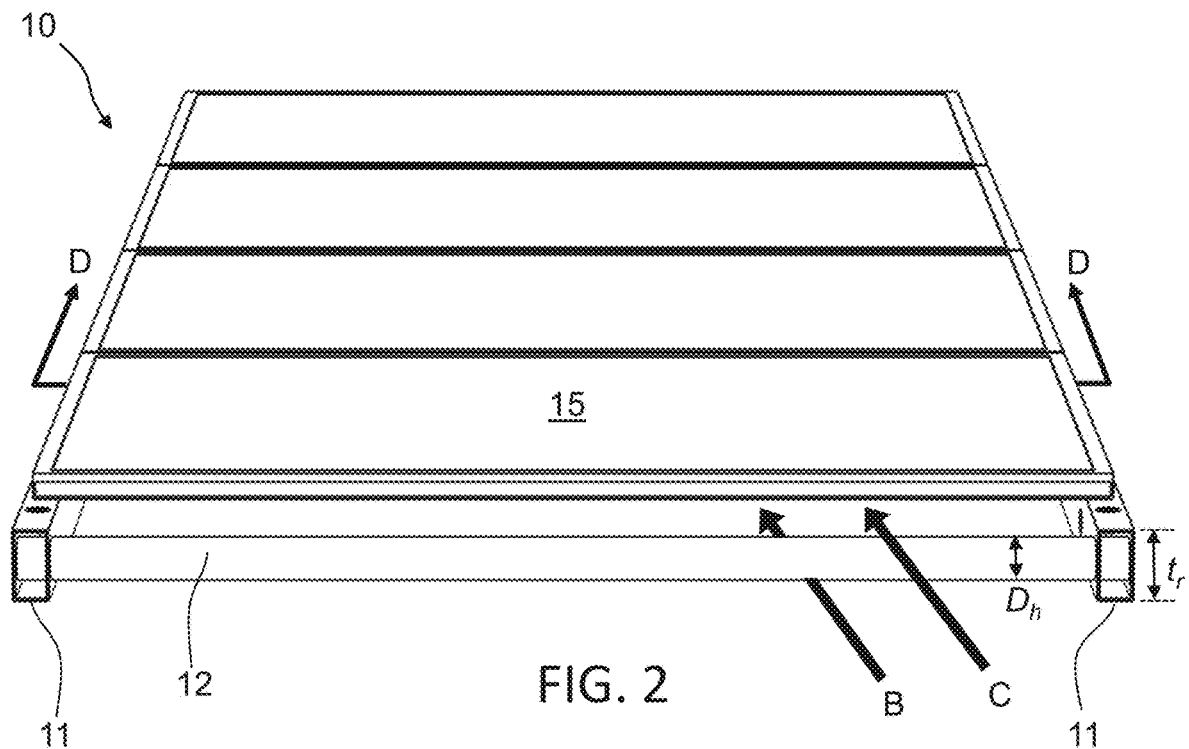
FIG. 2 shows a front perspective view of the solar panel assembly of FIG. 1.

Referring to FIGS. 1 and 2, an example solar panel assembly according to one implementation is shown.

As illustrated, a solar panel assembly 10 includes a pair of mounting rails 11 that are arranged to be parallel to each other and elongated along a longitudinal direction of the solar panel assembly 10. The mounting rails 11 can be made from various materials, including but not limited to metal, plastic, wood, and fiberglass, and may include various openings and coupling features as will be described further below. In one example, preformed aluminum rectangular tubes, for example having a width of 2 inches and a height of 4 inches, may be used by being cut to the desired length.

A first handle member 12 and a second handle member 13 may be disposed laterally between the pair of mounting rails 11. The handle members 12, 13 may be configured to promote ease of grasping and handling by a user. Accordingly, the handle member 12, 13 may have a circular cross-section with a diameter, $D_h$, of approximately 1 to 3 inches. Other types of cross-sections, for example rectangular, may be used in some cases. In some cases, the handle members may include a textured/soft/rubber surface to provide improved grip and comfort for the user.

Axial centers of each of the handle members 12, 13 may be positioned approximately 2 to 3 inches away from corresponding longitudinal ends of the mounting rails 11. As shown in FIG. 2, the lateral ends of the handle member 12, 13 may pass through an entire width of the mounting rails 11 through corresponding openings provided at the rails 11 to be securely attached, for example via press fitting and/or welding. In some cases, the lateral ends of the handle members 12, 13 may be affixed to just the inner surfaces of the mounting rails 11 without being further inserted into the mounting rails 11. The handle members 12, 13 may be made from same or different material as the mounting rails 11. In some cases, the handle members 12, 13 may be removably coupled to the mounting rails 11 such that they can be removed after installation of the solar panel assembly 10 at the desired location.

One or more solar panels 15 may be attached to the mounting rails 11 as illustrated in FIGS. 1 and 2. Each solar panel 15 may be made up of a plurality of smaller solar cells. In some cases, as illustrated, the solar panel may be surrounded by a frame that can provide additional structural support and protection. The frame may be made from metal and may surround an entire periphery of each solar panel 15. In some cases, the frame may be vertically thicker than the solar cells such that an empty space is defined below the solar panel 15. The empty space can help provide additional cooling to the underside of the solar panel 15 and can also provide space underneath for the various wiring associated with the solar panel 15.

As illustrated, the solar panels 15 may be arranged to be adjacent to each other along the longitudinal direction of the mounting rails 11. While FIG. 1 shows four solar panels 15 that are arranged to be adjacent to each other in a 4×1 configuration, other configurations—such as 3×1 or 5×1 just to name a few—may be used depending on the size of the panels and/or the length of the rails. Adjacent solar panels 15 may be positioned to be in close contact with each other. In some cases, gaskets or other sealing elements may be disposed between adjacent solar panels to help prevent water from flowing to the underside. Alternatively, the solar panels 15 may be positioned to define a gap between adjacent panels. For example, a gap of approximately 0.5 inches may be provided between panels. Such gaps may help compensate for thermal expansion and may also provide a flow path for additional air circulation underneath the panels.

The solar panels 15 may be mounted to an upper surface of the mounting rails 11 using bolts or other types of fasteners. For example, the upper surface of the mounting rails 11 can include a plurality of mounting holes 18 (FIG. 4) that are configured to receive the bolts/fasteners to thereby attach the solar panels 15 to the mounting rails 11.

While various commercially available solar panels can be used, each of the solar panels 15 may have, for example, a width in the lateral direction between 60 and 65 inches and a length in the longitudinal direction of between 40 and 45 inches. In some cases, as seen in FIG. 2, the width of the solar panels 15 may be slightly smaller, for example by 1 to 2 inches, than the overall width of the solar panel assembly 10 such that the a portion of the mounting rails 11 protrude laterally outward beyond the solar panels 15. This configuration can help provide additional edge protection to the solar panels 15, particularly during shipping or installation. The overall size of the resulting assembly 10 may be optimized to fit within a standard shipping container, as will be further described below.

In some implementations, the solar panels 15 may be positioned entirely between the inner surfaces of the pair of mounting rails 11. For example, the lateral outer surfaces of the solar panels 15 may be affixed to corresponding inner surfaces of the pair of mounting rails 11 such that the entire solar panel 15 is disposed between the mounting rails 11. In such cases, the solar panels 15 may be positioned such that the uppermost surfaces of the solar panels 15 are recessed downward relative to the uppermost surfaces of the mounting rails 11. Accordingly, the surface of the solar panels 15 may further be protected by the mounting rails 11.

As shown in FIG. 1, air gaps may be defined between the solar panels 15 and the handle members 12, 13. For example, a first air gap 16 may be defined between the first handle member 12 and a parallel edge of the solar panel 15 positioned closest to the first handle member 12. Similarly, a second air gap 17 may be defined between the second handle member 13 and a parallel edge of the solar panel 15 positioned closest to the second handle member 13. The air gaps 16, 17 may span across an entire lateral width of the solar panel assembly 10 and can each have a length of between 6 and 9 inches, for example, in the longitudinal direction. The air gaps 16, 17 can provide sufficient spacing between the handle members 12, 13 and the solar panels 15 such that rigging hooks and other types of securing means can be latched on to the handle member 12, 13 during transport and installation without coming into contact with and potentially damaging the solar panels 15. The air gaps 16, 17 can further provide entry/exit points for air flow underneath the solar panels 15. In some implementations, additional structures may be accommodated within the air gaps 16, 17 as further exemplified below with respect to FIG. 13.

In some implementations, the solar panels 15 may be provided along an entire length of the mounting rails 11. In such cases, the solar panels 15 may completely cover an upper side of the handle members 12, 13, and, as a result, the air gaps 16, 17 may not be provided. Accordingly, a more seamless solar panel array may be provided when connecting multiple solar panel assemblies 10 together end-to-end or side-to-side.

During use, solar panels can become hot as they tend to be positioned in sunny locations and can absorb heat energy. In some cases, excessive heating may reduce the efficiency of the solar cells. The solar panels may also trap heat and heat up the underlying structure on which it's mounted, such as the roof of a house. Accordingly, it can be advantageous to provide additional cooling to the solar panels by providing pathways for air flow underneath the solar panels. In residential applications, for instance, solar panels are often mounted a few inches above the roof, with airflow space beneath the solar panels, to help move heat away from the panels as well as the roof.

As shown in FIG. 2, open surfaces at the longitudinal ends of the solar panel assembly 10 can help improve airflow underneath the solar panels 15. For example, because the diameter $D_h$ (e.g., 2 inches) of the handle member 12 may be less than a thickness $t_r$ (e.g., 4 inches) of the mounting rail 11, gaps are provided at the longitudinal end faces of the solar panel assembly 10 above and/or below the handle member. Accordingly, outside air can more readily enter the region underneath the solar panels, as illustrated by arrows B and C, through the open end faces. Additional air can enter through the air gaps 16, 17 that are provided at the upper surface of the solar panel assembly 10 (FIG. 1). As further explained below with respect to FIG. 6, an airflow passage 25 may be defined below the solar panels 15 to provide a continuous airflow underneath. Accordingly, air that enters at one longitudinal end of the solar panel assembly 10 may exit at the opposite longitudinal end, and vice versa.

Figure 3:
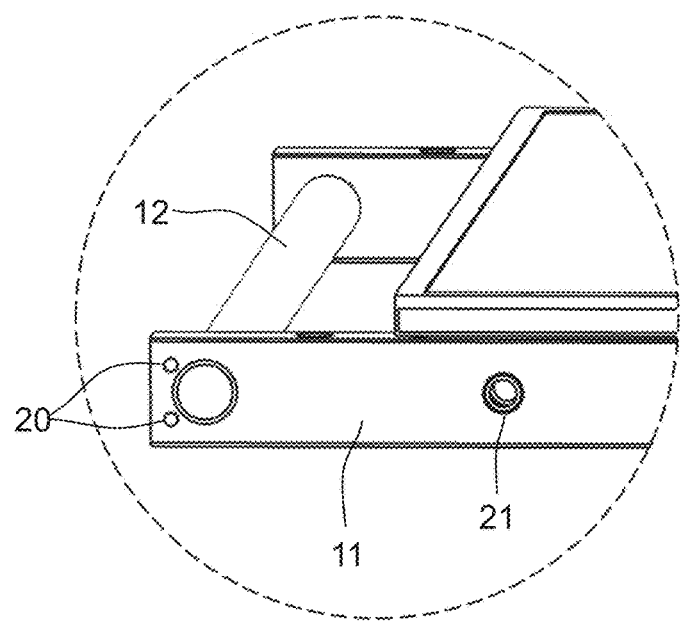
FIG. 3 shows a close-up view of area A in FIG. 1

FIG. 3 is a close-up of area A in FIG. 1. As illustrated, the outer lateral surfaces of the mounting rails 11 can include one or more lateral coupling holes 20. The lateral coupling holes 20 are designed to be aligned with corresponding lateral coupling holes of an adjacently positioned solar panel assembly 10 such that multiple solar panel assemblies can be attached to each other in the lateral direction (see, e.g., FIGS. 8 and 11). A nut and bolt assembly or other types of coupling structures can be inserted through adjacently positioned and aligned lateral coupling holes 20 to thereby attach the solar panel assemblies to each other. In some implementations, wire grommets 21 may be provided at the mounting rails 11. For example, wire grommets 21 positioned at the outer lateral surfaces of the mounting rails 11 can be used to pass through and connect wiring between solar panel assemblies that are coupled to each other.

Figure 4:
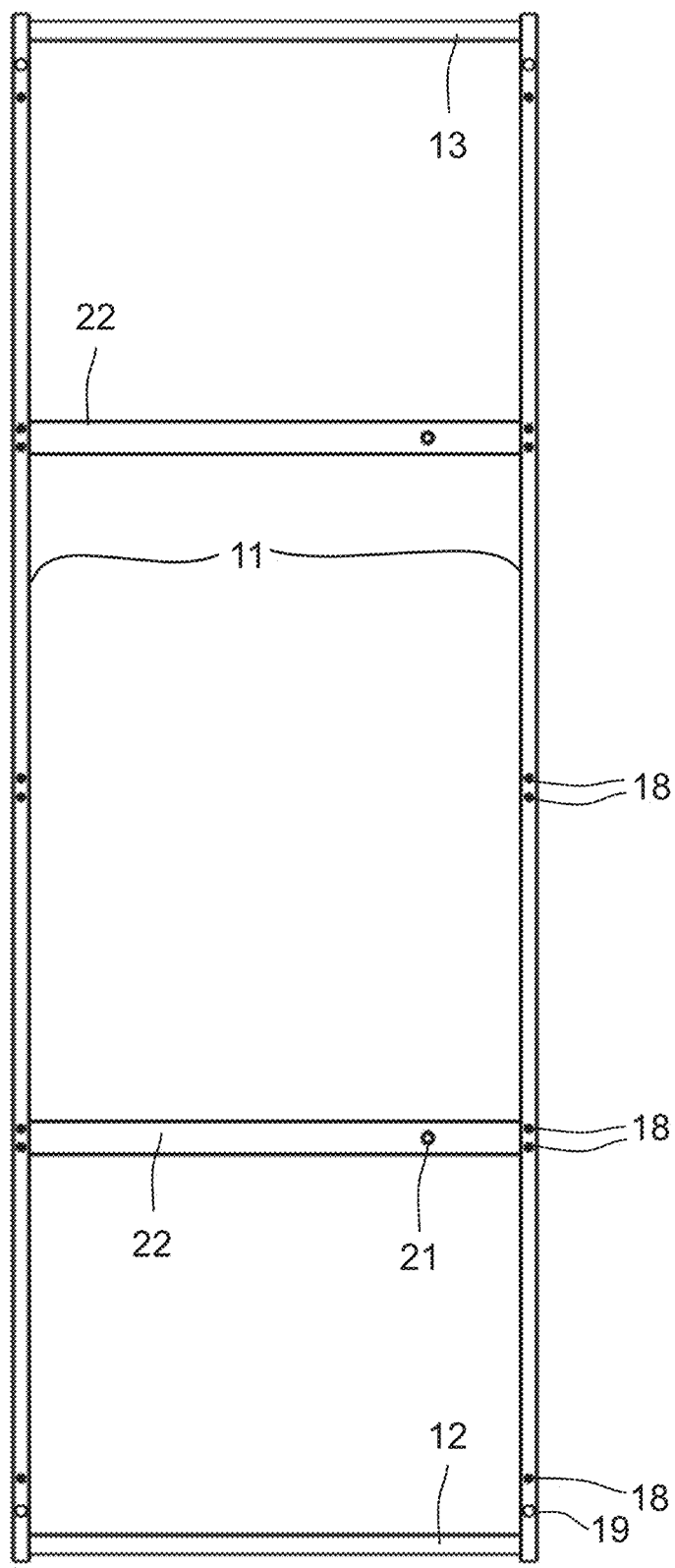
FIGS. 4 and 5 show top and side views, respectively, of internal structures of the solar panel assembly of FIG. 1.
Figure 5:
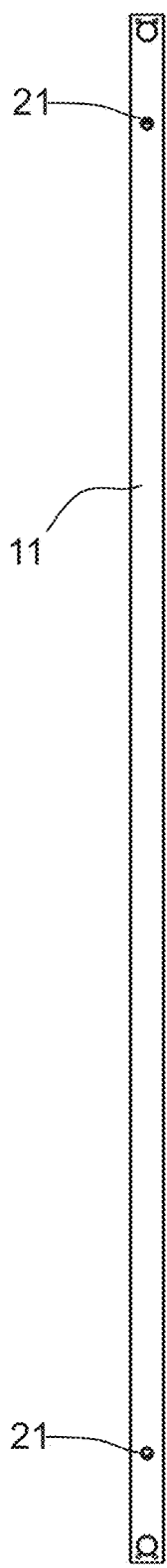

Referring also to FIGS. 4 and 5, the mounting rails 11 and other structural elements of the solar panel assembly 10 are shown without the solar panels 15. As noted above, the solar panels may be removably mounted to the mounting rails 11 via mounting holes 18, for example.

One or more cross members 22 may be provided between the pair of mounting rails 11. The cross members 22 are designed to provide additional structural support to the solar panel assembly 10. In one implementation, the cross members 22 may be welded to the inner surfaces of the mounting rails 11. The inner surface of the mounting rail 11 at which the cross member is attached may define an opening that corresponds to a hollow interior of the cross member 22. Accordingly, an interior conduit, which for example can be used to accommodate wiring and other components of the solar panel assembly 10, may be continuously formed throughout the interior portions of the mounting rails 11 and the cross members 22. The cross members 22 may be made from same or different materials as the mounting rails 11. In some cases, preformed aluminum rectangular tubes, for example having a width of 2 inches and a height of 4 inches, may be used by being cut to the desired length. In some cases, the cross members may have a width of 4 inches and a height of 2 inches. The cross-sectional area of the cross members 22 may be greater than the cross-sectional area of the handle members 12, 13.

The number of cross members 22 provided may depend on the weight and rigidity requirements of the particular system, among others. While two cross members 22 are shown in FIG. 4, different numbers of cross members 22 may be used as needed. For example, fewer cross members 22, for example just one cross member 22, may be provided if minimizing weight is a critical feature. In other cases, more cross members 22, for example three or four cross members 22, may be provided if maximizing structural rigidity is important. While at least one cross member 22 should be provided for structural rigidity, no cross members may be provided in certain cases if sufficient structural rigidity is provided by the two handle members 12, 13.

As shown in FIG. 4, the cross members 22 may be disposed at locations that correspond to seams or gaps between adjacent solar panels 15. Alternatively, the cross members 22 may be disposed at locations that do not overlap with the seams. By providing the cross members 22 at locations that do not overlap with the gaps between the solar panels 15, air flow entering the space underneath the solar panels 15 through the gaps may be minimally impeded by the cross members 22.

Figure 6:
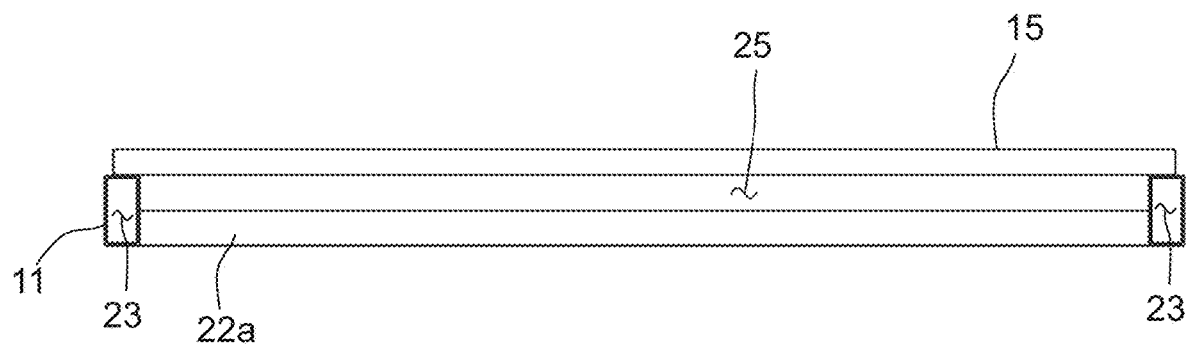
FIG. 6 shows a cutaway view of the solar panel assembly 10 taken along line D-D in FIG. 2 according to one implementation.
Figure 7:
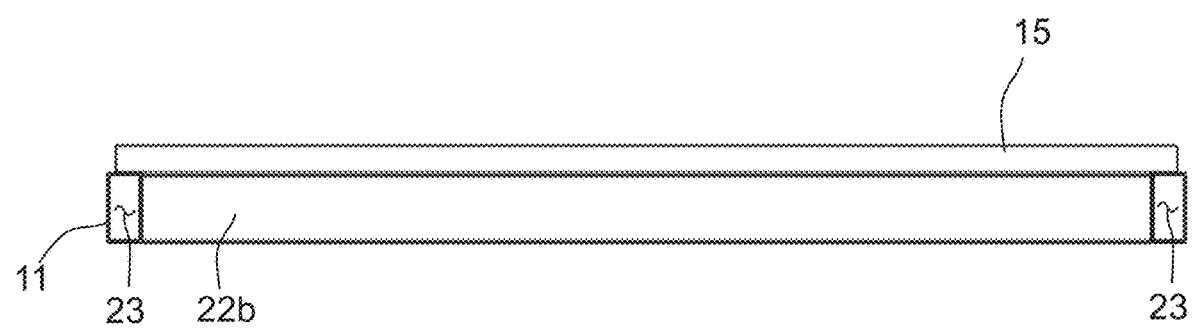
FIG. 7 shows a cutaway view of the solar panel assembly 10 taken along line D-D in FIG. 2 according to an alternative implementation.

Referring further to FIGS. 6 and 7, cutaway views of the solar panel assembly 10 taken along line D-D in FIG. 2 are shown. Alternative implementations of the cross member 22 are depicted in FIGS. 6 and 7, respectively.

As shown in FIG. 6, a cross member 22a may have a vertical thickness that is less than that of the mounting rails 11. For example, the cross members 22a may have a thickness that is approximately half of the mounting rails 11. Accordingly, a continuous airflow passage 25 may be defined through an entire longitudinal length of the solar panel assembly 10 between the lower surfaces of the solar panels 15 and the upper surfaces of the cross members 22a. Thus, air entering the region underneath the solar panels 15 from either of the open end faces at the longitudinal ends of the mounting rails 11 can have a substantially unimpeded, continuous pathway for flowing underneath the solar panels 15. The resulting improvement in air flow may help move away more heat from the panels.

In some implementations, as shown in FIG. 7, a cross member 22b may have a vertical thickness that is equal or substantially equal to that of the mounting rails 11. In such cases, air underneath the solar panels can flow over the cross members 22b via the empty space that is defined below the solar panel 15 by the frame surrounding each solar panel 15. Here, positioning the cross members 22b to not overlap with the seams/gaps between the solar panels 15, as noted above, can help provide a clearer pathway for airflow to runs continuously beneath the solar panels 15.

In some implementations, because hollow structures such as aluminum pipes can be used to form the mounting rails 11 as well as the cross members 22, a hollow interior conduit 23 can be formed within the mounting rails 11 and the cross members 22. Accordingly, various wiring and other components of the solar panel assembly 10, such as cable and wires for the solar panels 15, can be routed inside these conduits. As further illustrated in FIG. 4, various wire grommets 21 may be positioned at desired locations throughout the mounting rails 11 and the cross members 22 to help route such wiring into and out of the interior conduit 23.

Referring back to FIG. 1, the overall dimensions of the solar panel assembly 10 may be optimized for transport. For example, the solar panel assembly 10 may be sized to be easily transportable in standard shipping containers, which can generally have dimensions of around 8 ft. (W)×8 ft. (H)×20 ft. (L). Shipping containers having shorter (e.g., 10 ft.) or longer (e.g., 40 ft.) lengths are also widely available.

In view of standard shipping container sizes, which are often employed in field-deployable applications, the solar panel assembly 10 may have, for example, a longitudinal length of approximately 180 to 190 inches, a lateral width of approximately 60 to 70 inches, and a vertical thickness of 6 to 10 inches. Accordingly, approximately 10 to 15 solar panel assemblies 10 having these exemplary dimensions may be safely transported in a 8'×8'×20' container. Of course, a greater or fewer number of solar panel assemblies may be transported depending on the particular sizes of the solar panel assemblies and the shipping containers.

In some implementations, horizontal or vertical racks may be provided inside the shipping containers to keep the solar panel assemblies 10 secured and spaced apart from each other during transport. A tray rack configuration, for instance, may be used. Alternatively, spacers may be placed between adjacent solar panel assemblies 10 to maintain spacing between the solar panel assemblies 10 during shipping.

Figure 8:
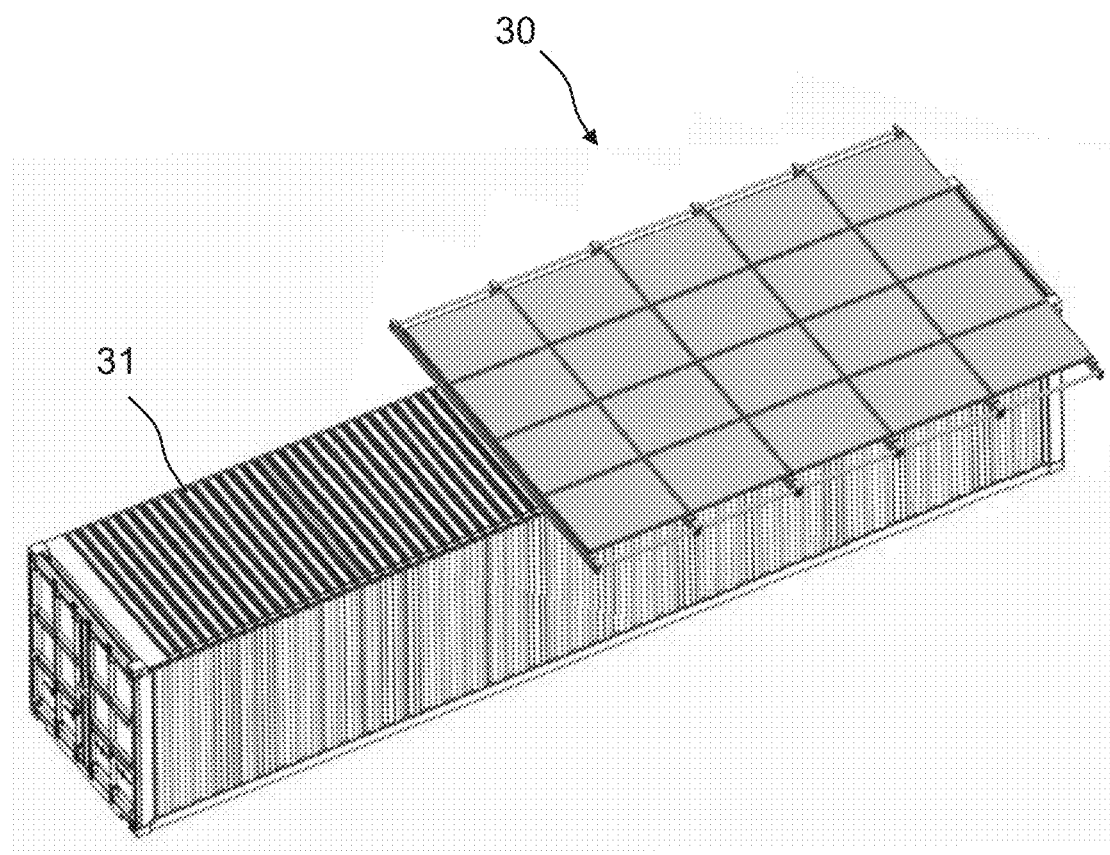
FIG. 8 shows a perspective view of an example solar panel system mounted on a shipping container.

Referring now to FIG. 8, an example interconnected solar panel system 30, which is made up of individual solar panel assemblies 10 that are attached to each other, is shown. The solar panel system 30 may be mounted to a shipping container 31, as illustrated, to generate power while also providing additional cooling and shading to the shipping container 31. In some cases, the shipping container 31 may be used as an office or a workspace, for example. As explained above, the solar panel assemblies 10 may be attached to each other via lateral coupling holes 20 (FIG. 3).

In one implementation, in order to mount the solar panel system 30 onto a structure such as the shipping container 31, the solar panel system 30 may first be leaned against the shipping container 31 such that one longitudinal end of the system is placed on the ground and the other end is elevated above the shipping container 31. Then, the entire solar panel system 30 may be pivoted onto the top surface of the structure by pulling on the elevated end and/or pushing upward on the grounded end. Ropes and other types of rigging devices may be used to grab onto the handle member at the elevated end and pull on the handle member to pivot the solar panel system 30 onto the shipping container 31. Accordingly, the use of cranes, forklifts, or other large equipment may not be needed to lift the solar panel system 30 onto the shipping container 31.

Once the solar panel system 30 has been positioned at the desired location atop the shipping container 31, the solar panel system 30 may be fixed in place using conventional mounting hardware. In some cases, solar panel assemblies 10 may first be individually positioned atop the shipping container 31 in the manner described above and subsequently attached to each other. In some cases, the solar panel system 30 may be fixed to corrugated steel panels that are pre-installed on top of the shipping container 31.

In some implementations, conventional racking systems may not be required to affix the solar panel system 30 to the container. For example, wires, ropes, and other types of rigging equipment may be used to directly tie the solar panel system to the shipping container, for example to its corners, to provide a secure attachment to the shipping container. Alternatively, or additionally, wires or ropes tied to the solar panel system 30 may be attached to sandbags and other anchors that are placed on the shipping container or on the ground. In some cases, sandbags or other heavy objects may simply be placed on top of the solar panel system 30 to keep it fixed atop the shipping container.

Although the solar panel system 30 shown in FIG. 8 includes solar panel assemblies that are laterally connected to each other, solar panel assemblies may alternatively or additionally be connected to each other along the longitudinal direction. For instance, the pair of mounting rails of a first solar panel assembly may be aligned with and attached to the pair of mounting rails of a second solar panel assembly. A connection plate may be used, for example, to connect the mounting holes 20 of the first solar panel assembly to those of the second solar panel assembly.

Figure 9:
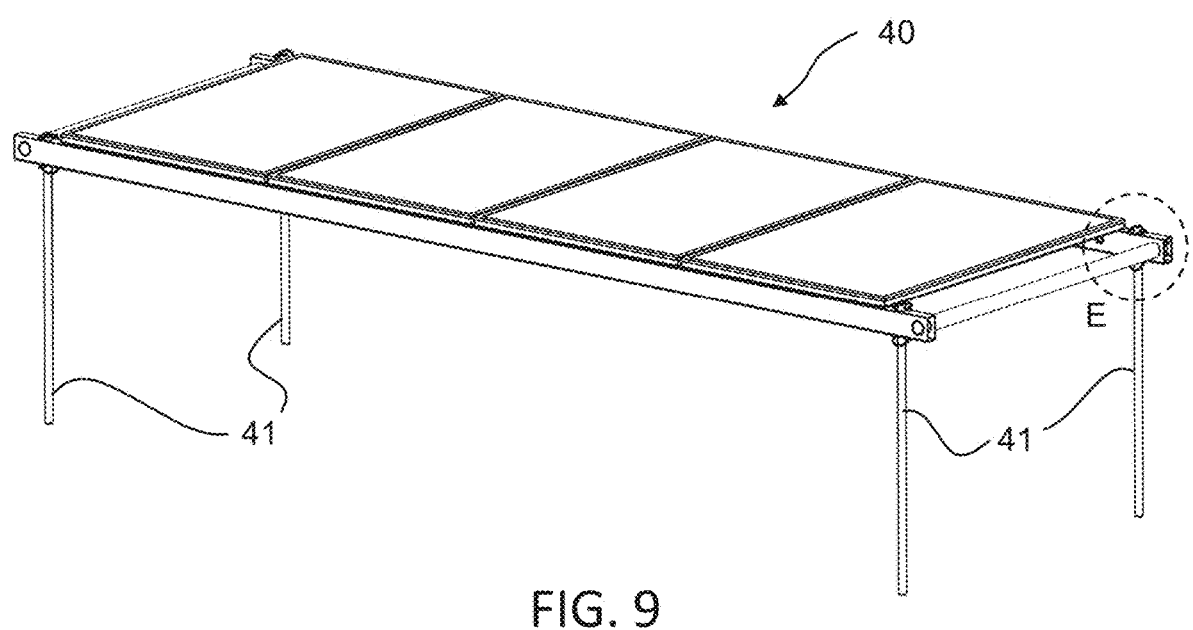
FIG. 9 shows a perspective view of an example free-standing solar panel assembly.
Figure 10:
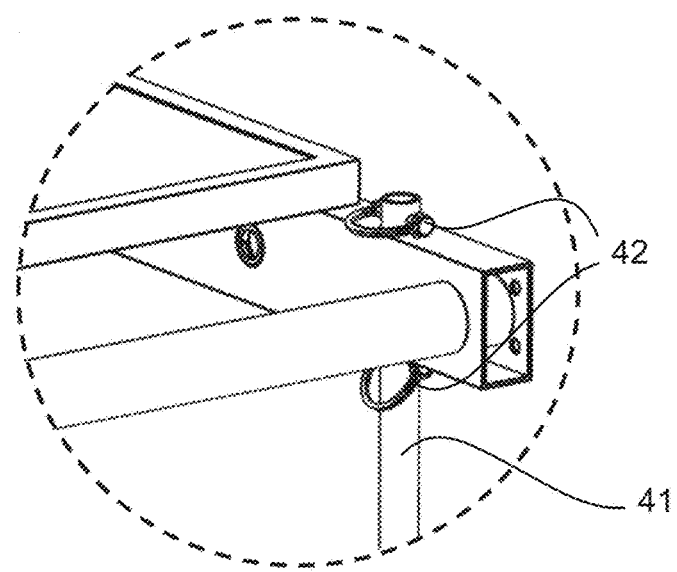
FIG. 10 shows a close-up view of area E in FIG. 9.

Referring to FIGS. 9 to 10, an example free-standing solar panel assembly 40 is illustrated. FIG. 10 shows a close-up of area E in FIG. 9.

The free-standing solar panel assembly 40 may include support legs 41 that support and elevate the assembly off the ground. The free-standing solar panel assembly 40 can thus be used as an outdoor canopy or shade, for instance, to provide protection from sun and rain. The structural configuration of the free-standing solar panel assembly 40 may be otherwise identical to that of the solar panel assembly 10 as described above with respect to FIGS. 1-7.

As shown in FIG. 10, the support legs 41 may be inserted through support leg openings 19 (FIG. 4) that are provided at longitudinal end portions of the mounting rails 11. The support legs 41 may be secured in place via wire lock pins 42 or other types of securing mechanisms. The support leg 41 may be made from metal or other suitable materials and can have a diameter of approximately 1 to 2 inches and a length of approximately 2 to 10 feet. In some cases, metal and other types of pipes may be used to form the support legs 41.

In some implementations, the height of the support legs 41, either individually or collectively as a group, may be adjusted to adjust an elevation height of the solar panels. Additionally, individual heights of the supports legs 41 may be adjusted to account for uneven terrain, thereby allowing the solar panel structure to maintain stability. In some cases, the height of one or more of the support legs 41 may be adjusted to provide a tilt to the solar panels. As one example, two support legs at one longitudinal end of the solar panel assembly may be made shorter to allow water and other debris accumulated on the solar panel surface to flow toward the vertically lower side. In some cases, a gutter structure (FIG. 13) may be positioned at the vertically lowered side to collect and/or channel away the water and debris. The heights of the support legs may also be adjusted to tilt the solar panel toward sunlight, thereby helping to enhance photovoltaic efficiency.

In some implementations, the support legs 41 may include a plurality of receiving holes that are spaced apart along a length of the support leg and that are configured to receive the wire lock pins 42 or other types of securing mechanisms. By inserting the wire locks 42 into different receiving holes provided along the support leg, the effective height of the support leg 41 may be adjusted.

Figure 11:
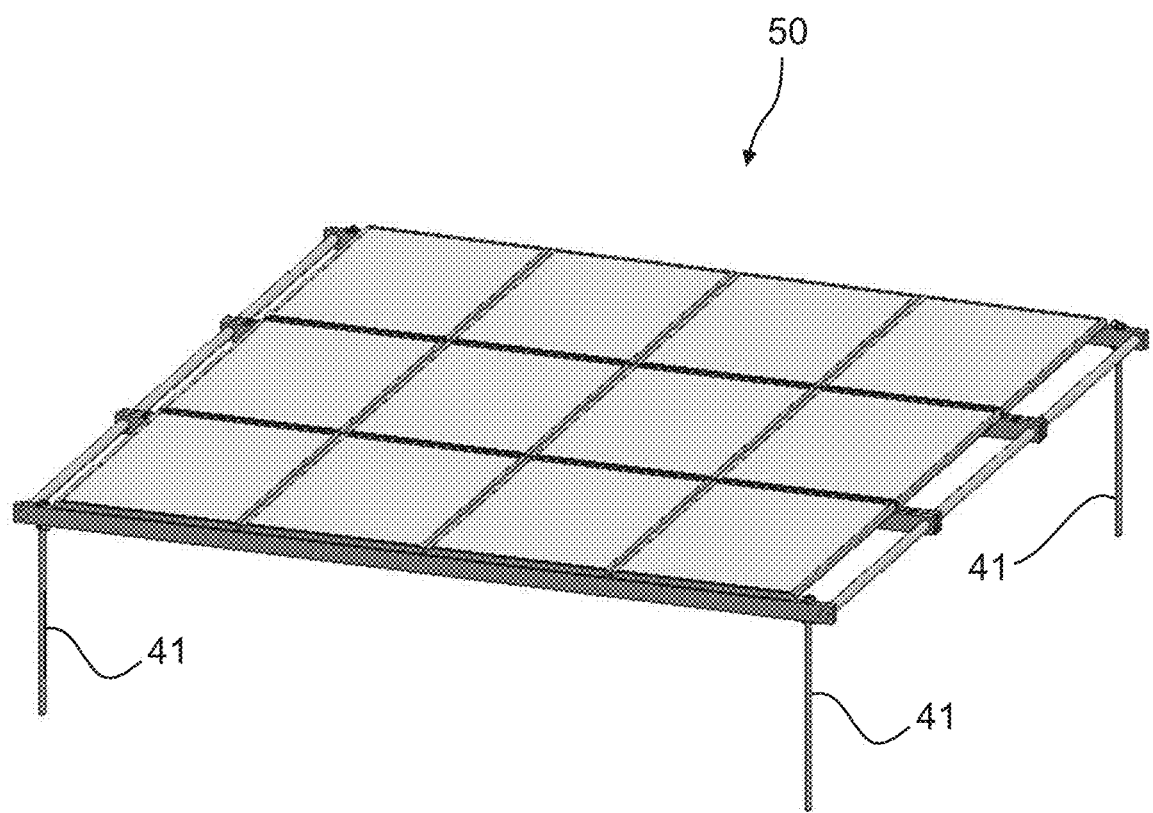
FIG. 11 shows a perspective view of an example free-standing solar panel system.

An example free-standing solar panel system 50 is shown in FIG. 11. As illustrated, a plurality of free-standing panel assemblies 40 may be attached to each other via lateral coupling holes 20 (FIG. 3) to provide a larger surface area. The total number of support legs 41 may be adjusted as needed. For example, as illustrated, the support legs 41 may only be provided at the four corners of the overall system 50. This configuration can help maximize usable space underneath the structure. Additional support legs 41 may be provided to the interior mounting rails 11 as needed for additional support. Gaskets or other sealing elements may be disposed between adjacently positioned solar panel assemblies to help prevent water from flowing to the underside of the solar panels.

In some implementations, the free-standing solar panel assembly 40 or the free-standing solar panel system 50 may be secured further through additional anchoring features, for example to withstand wind gusts. In one example, wires/ropes may be used to secure the solar panel assembly/system to the ground, for example by using stakes, sandbags, or other types of anchors that anchor the wires/ropes to the ground. The other end of the wires/ropes may be tied around the handle members or the mounting rails as needed.

Figure 12:
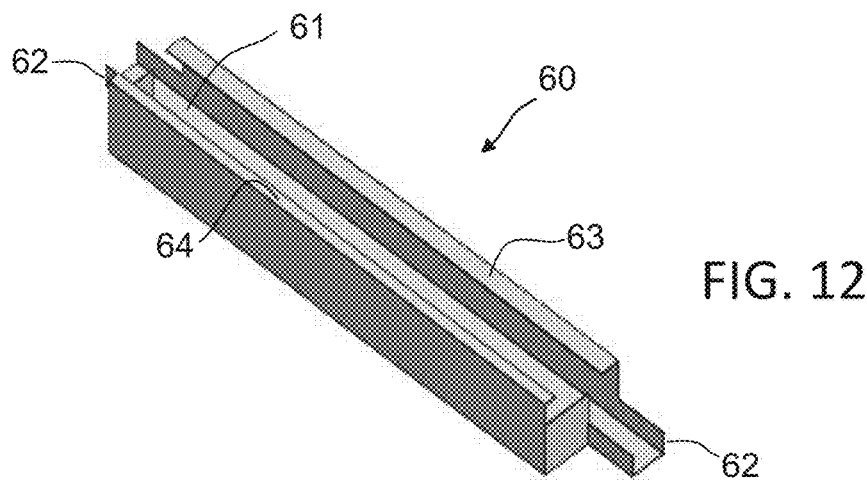
FIG. 12 shows a perspective view of an example gutter structure.
Figure 13:
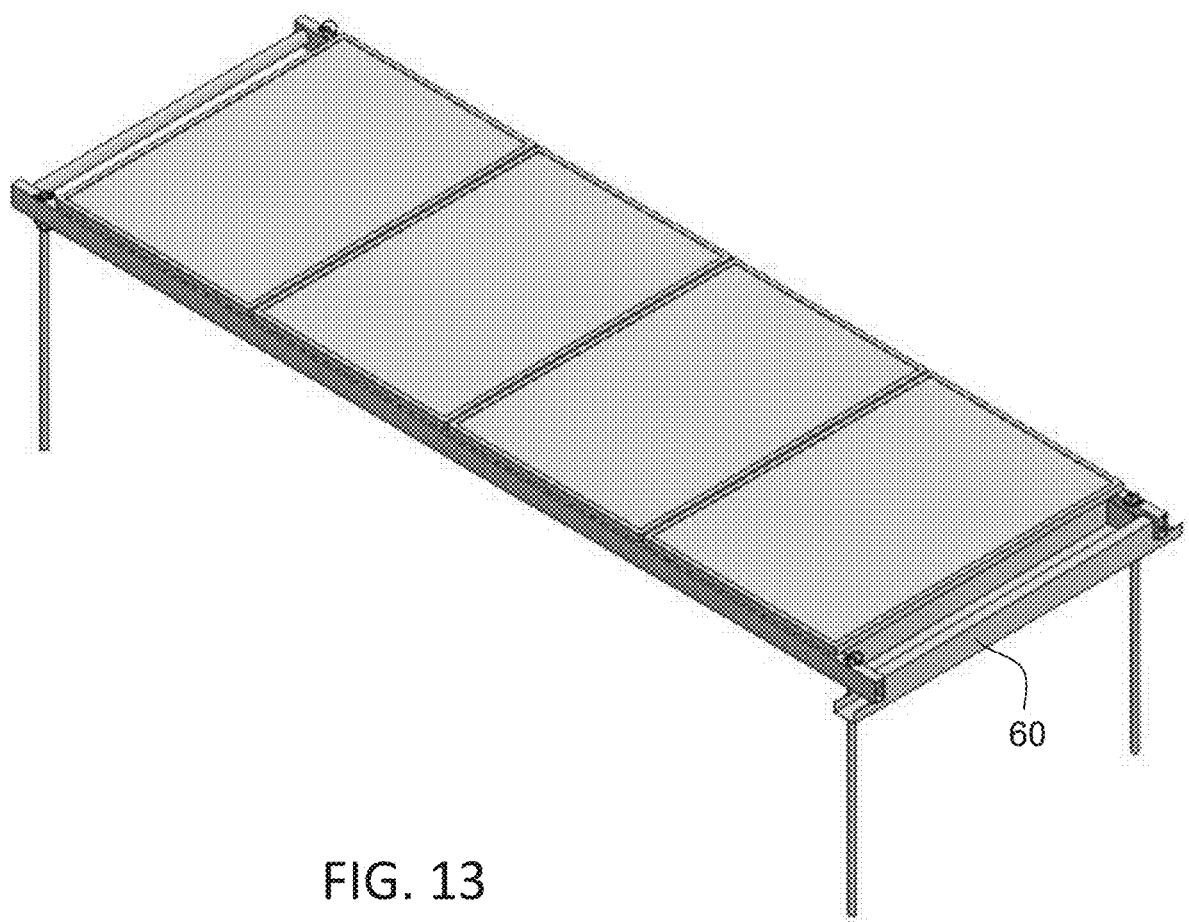
FIG. 13 shows a perspective view of an example solar panel assembly incorporating the gutter structure of FIG. 12.

Referring to FIGS. 12 and 13, a gutter structure 60 can be accommodated at one or both longitudinal ends of the solar panel assembly 10 to help collect and channel away water and other debris from the surface of the solar panels. As illustrated in FIG. 13, the gutter structure 60 may be installed within one or both of the air gaps 16, 17.

In some implementations, the solar panel assembly 10 may be tilted, for example by mounting on the shipping container 31 at an angle or by providing support legs 41 at one longitudinal end that are slightly shorter than the support legs 41 at the opposite end. In such cases, the tilt of the solar panel assembly 10 may serve to direct water and debris toward the air gap positioned at the vertically lower end of the solar panel assembly 10. The gutter structure 60 may be installed in the vertically lower air gap to help collect and channel water away from the solar panel assembly 10.

As illustrated in FIG. 12, the gutter structure 60 may include a central cavity 61 that is designed to receive the water/debris from the surface of the solar panels and one or two spouts 62 positioned at lateral end portions of the central cavity 61 to direct the received water/debris away from the solar panel assembly.

The gutter structure 60 may be mounted to the solar panel assembly via an outer engagement portion 63 and an inner engagement portion 64 that extend vertically upward from the central cavity 61. The outer engagement portion 63 may be designed to latch onto the handle member, and the inner engagement portion 64 may be designed to latch onto the frame of the solar panel.

In some implementations, adjacent gutter structures 60 can be configured to couple to each other. For example, when two solar panel assemblies are attached side-to-side, the spout of one gutter structure may be configured to be inserted into central cavity of the other gutter structure, thereby providing a fluidic connection between the two gutter structures. In such cases, all of the collected water/debris from multiple central cavities may be channeled away through a single, laterally outermost spout. In some implementations, cisterns, barrels, and water types of water containers may be placed on the ground and used to collect water that has been discharged through the spout 62.

Figure 14:
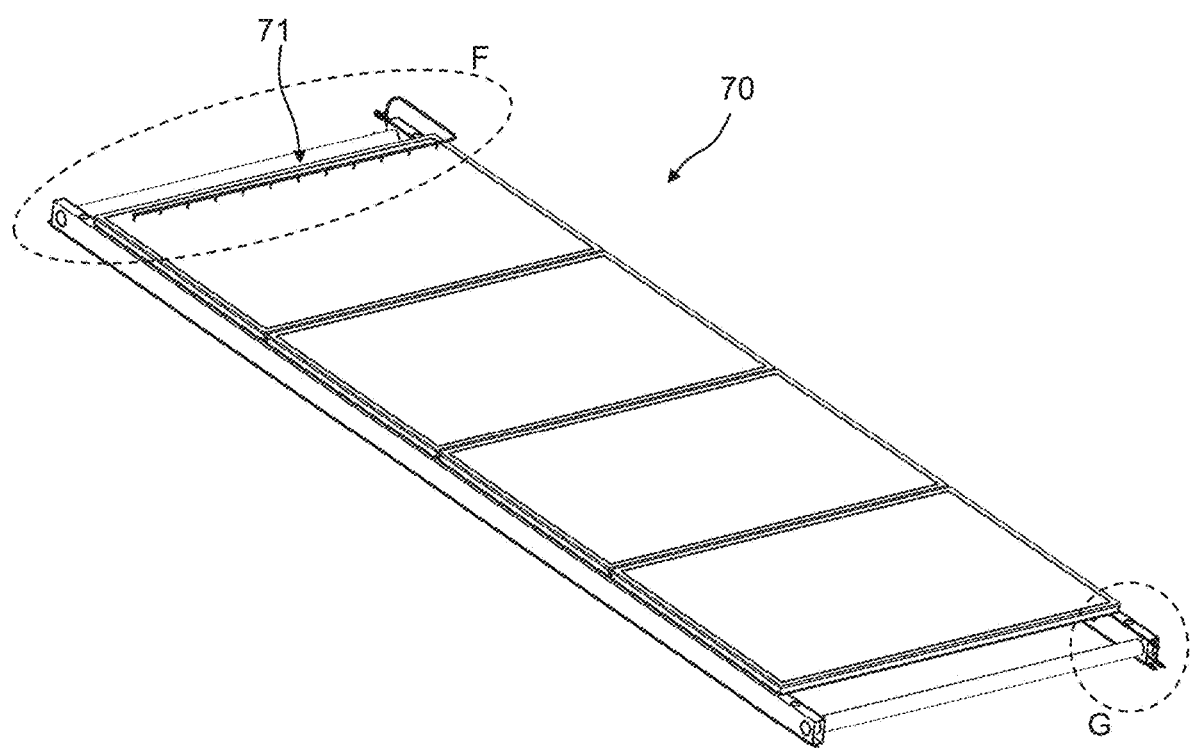
FIG. 14 shows a perspective view of an example solar panel assembly having a pressure washing system.
Figure 15:
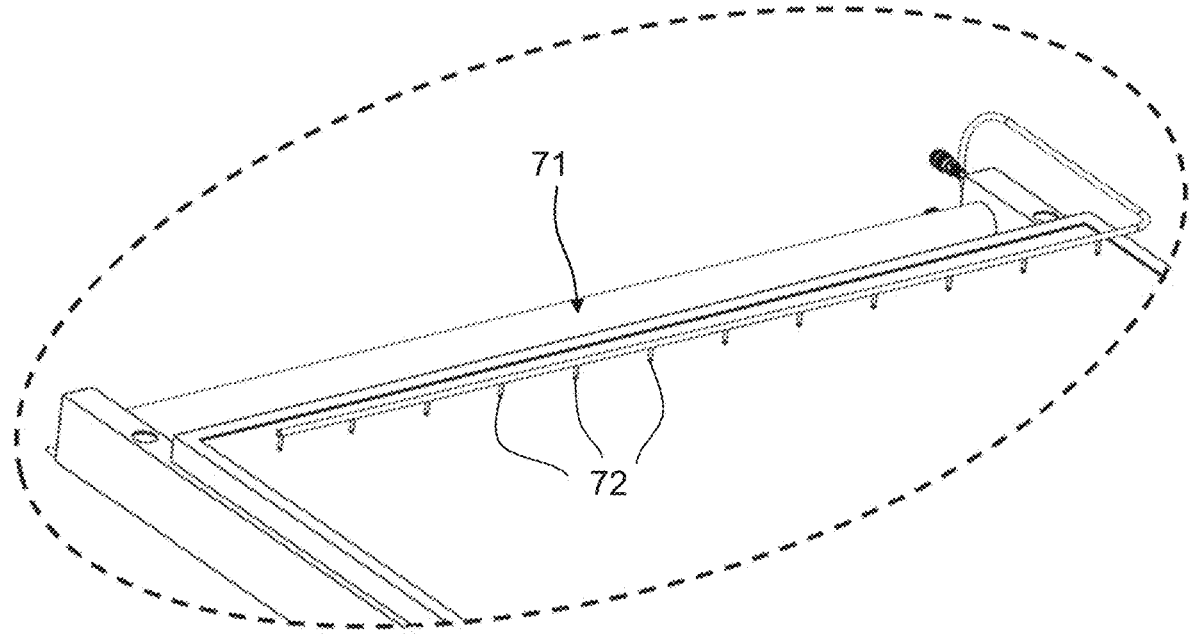
FIGS. 15 and 16 show close-up views of areas F and G in FIG. 14, respectively.
Figure 16:
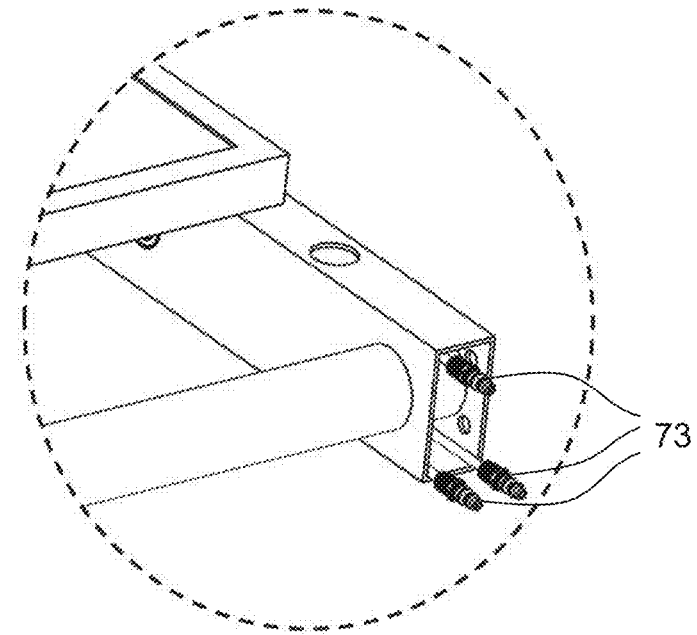

Referring to FIGS. 14 to 16, an example solar panel assembly 70 having a pressure washing system 71 is illustrated. FIG. 15 shows a close-up of area F in FIG. 14, and FIG. 16 shows a close-up of area G in FIG. 14. Except for the pressure washing system 71, the structural configuration of the solar panel assembly 70 may be otherwise identical to that of the solar panel assembly 10 as described above with respect to FIGS. 1-7.

The pressure washing system 71 may be provided at one end of the solar panel assembly 70 to help clear way dust and other debris that may have accumulated on the solar panels. As seen in FIG. 15, the pressure washing system 71 may include a plurality of spray nozzles 72 that are designed to spray water directly onto the solar panel surface. For example, the spray nozzles 72 may be evenly distributed across an entire lateral width of the solar panels. The spray nozzles 72 may be positioned 1 to 3 inches from the solar panel surface, for example. The gutter structure 60, as discussed above with respect to FIG. 13, may be positioned at the opposite end of the solar panel assembly 70 to help collect and channel away the sprayed water.

Referring also to FIG. 16, the pressure washing system 71 may include water supply pipes 73 provided within the interior conduits 23 to help supply pressurized water to the spray nozzles 72. The water supply pipes 73 may include quick-disconnect fittings to help easily connect to adjacent solar panel assemblies or to an external water source.

The above description is merely illustrative of the technical idea of the present disclosure, and various modifications and changes may be made thereto by those skilled in the art without departing from the essential characteristics of the present disclosure. Therefore, the implementations of the present disclosure are not intended to limit the technical spirit of the present disclosure but to illustrate the technical idea of the present disclosure, and the technical spirit of the present disclosure is not limited by these implementations.

What is claimed is:

1. A modular solar panel assembly, comprising:
   a pair of mounting rails that extend parallel to each other along a longitudinal direction of the solar panel assembly, a first interior conduit being defined within each of the pair of mounting rails and extending continuously along a length of the pair of mounting rails;
   a first handle member extending laterally between the pair of mounting rails at a first longitudinal end portion of the mounting rails;
   a second handle member extending laterally between the pair of mounting rails at a second longitudinal end portion of the mounting rails opposite the first longitudinal end portion;
   one or more cross members that extend laterally between the pair of mounting rails, the one or more cross members being positioned between the first and second handle members in the longitudinal direction; and
   a plurality of solar panels that are attached to the pair of mounting rails, the plurality of solar panels being arranged adjacent to each other along the longitudinal direction,
   wherein a first gap that extends along the longitudinal direction is defined longitudinally between the first handle member and a first longitudinal edge of the plurality of solar panels that is closest to the first handle member, and a second gap that extends along the longitudinal direction is defined longitudinally between the second handle member and a second longitudinal edge of the plurality of solar panels that is closest to the second handle member, wherein a vertical thickness of the first and second handle members along a vertical direction that is orthogonal to the longitudinal and lateral directions is less than a vertical thickness of the pair of mounting rails, wherein a second interior conduit is defined within an interior of at least one of the one or more cross members, the second interior conduit being extended along a length of the at least one of the one or more cross members, wherein an inner surface of the mounting rails at which the at least one of the one or more cross members is attached defines an opening through which the first interior conduit is connected to the second interior conduit, and wherein a lowermost surface of the first and second handle members is positioned vertically higher than a lowermost surface of the mounting rails, and an uppermost surface of the first and second handle members is positioned vertically lower than a lowermost surface of the plurality of solar panels.

2. The modular solar panel assembly of claim 1, wherein a cross-sectional area of the one or more cross members is greater than a cross-sectional area of the first and second handle members.

3. The modular solar panel assembly of claim 1, wherein the first and second handle members have a circular cross-section.

4. The modular solar panel assembly of claim 3, wherein the first and second handle members include a textured or rubberized outer surface.

5. The modular solar panel assembly of claim 1, wherein the pair of mounting rails and the one or more cross members have a rectangular cross-section.

6. The modular solar panel assembly of claim 1, wherein the plurality of solar panels are attached to an upper surface of the pair of mounting rails.

7. The modular solar panel assembly of claim 1, wherein an airflow passage is defined between a lower surface of the plurality of solar panels and an upper surface of the one or more cross members and the first and second handle members, the airflow passage extending continuously from the first longitudinal end portion to the second longitudinal end portion.

8. The module solar panel assembly of claim 1, wherein the first and second handle members and the pair of mounting rails define open faces at respective longitudinal end surfaces of the solar panel assembly.

9. The modular solar panel assembly of claim 6, wherein the upper surface of the one or more cross members are positioned vertically lower than the upper surface of the pair of mounting rails.

10. The modular solar panel assembly of claim 1, further comprising a plurality of support legs that extend vertically downward from the first and second longitudinal end portions of the mounting rails to elevate the plurality of solar panels from a ground surface, wherein the modular solar panel assembly is configured to be free standing on the ground surface via the plurality of support legs.

11. The modular solar panel assembly of claim 1, further comprising a gutter structure that is accommodated in one or both of the first and second gaps, the gutter structure being configured to receive water flowing from upper surfaces of the plurality of solar panels.

12. The modular solar panel assembly of claim 11, wherein the gutter structure includes one or more side spouts that extend laterally beyond the lateral outer surfaces of the mounting rails to discharge the received water.

13. The modular solar panel assembly of claim 1, wherein a metal frame surrounds a periphery of each of the plurality of solar panels, the metal frame defining a space underneath the solar panel.

14. The modular solar panel assembly of claim 1, wherein one or more of the one or more cross members are provided at positions that correspond to gaps defined between adjacent ones of the plurality of solar panels.

15. The modular solar panel assembly of claim 1, wherein one or more of the one or more cross members are provided at positions that do not overlap with gaps defined between adjacent ones of the plurality of solar panels.

16. The modular solar panel assembly of claim 1, wherein a pressure washing system is provided at one longitudinal end of the solar panel assembly, the pressure washing system being configured to spray water onto a surface of the plurality of solar panels.

17. The modular solar panel assembly of claim 16, wherein water supply pipes are disposed inside the mounting rails, the water supply pipes being configured to supply pressurized water to the pressure washing system.

18. A solar panel system comprising a plurality of the modular solar panel assemblies of claim 1, wherein the plurality of modular solar panel assemblies are arranged adjacent to each other along the lateral direction and coupled to each other via coupling holes defined at lateral outer surfaces of each of the mounting rails.

19. The solar panel system of claim 18, comprising a plurality of support legs that extend vertically downward from four corner regions of the solar panel system to elevate the plurality of the modular solar panel assemblies from a ground surface, wherein the solar panel system is configured to be free standing on the ground surface via the plurality of support legs.

20. The solar panel system of claim 18, wherein one or more sealing elements are provided between adjacent ones of the plurality of modular solar panel assemblies.

* * * * *